No. 863,358. PATENTED AUG. 13, 1907.
N. H. CHALFANT.
COMBINATION WAGON AND SLED.
APPLICATION FILED FEB. 7, 1907.

2 SHEETS—SHEET 1.

WITNESSES:
Clara A. Priddy
John W. Ryan

INVENTOR
Noah H. Chalfant,
BY
Thomas L. Ryan
ATTORNEY

No. 863,358. PATENTED AUG. 13, 1907.
N. H. CHALFANT.
COMBINATION WAGON AND SLED.
APPLICATION FILED FEB. 7, 1907.
2 SHEETS—SHEET 2.
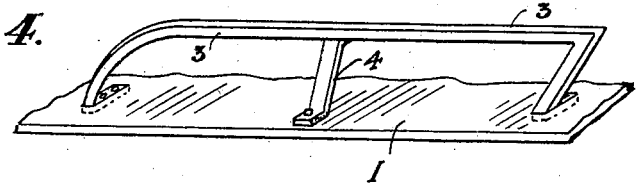
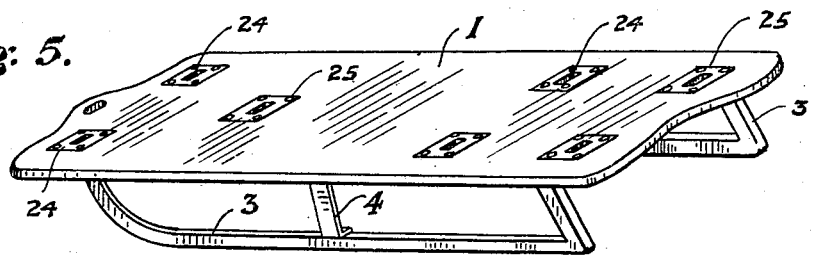
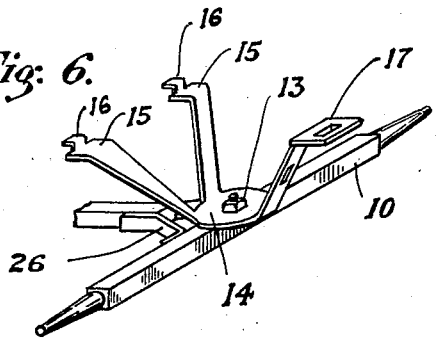
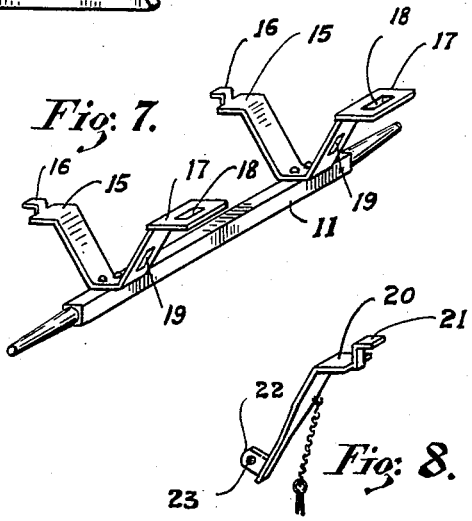
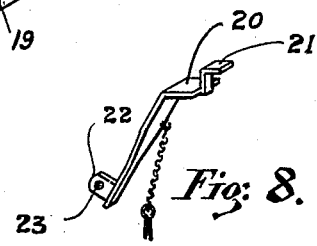
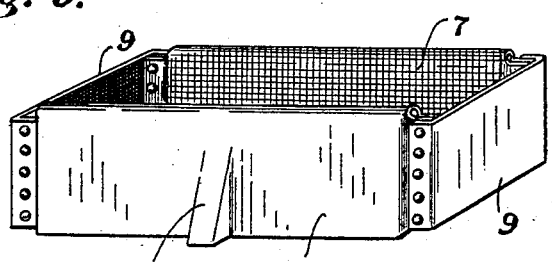
WITNESSES:
Clara A. Priddy
John W. Ryan
INVENTOR
Noah H. Chalfant,
BY
Thomas L. Ryan
ATTORNEY
THE NORRIS PETERS CO., WASHINGTON, D. C.

UNITED STATES PATENT OFFICE.

NOAH H. CHALFANT, OF MUNCIE, INDIANA.

COMBINATION WAGON AND SLED.

No. 863,358.    Specification of Letters Patent.    Patented Aug. 13, 1907.

Application filed February 7, 1907. Serial No. 356,150.

*To all whom it may concern:*

Be it known that I, NOAH H. CHALFANT, of Muncie, in the county of Delaware and State of Indiana, have invented a new and useful Combination Wagon and Sled, of which the following is a specification.

My invention has for its object to provide a new and useful vehicle that may be of utility either as a wagon or as a sled.

In those parts of the country where the winter season is comparatively short and the surface of the earth is in condition for use for the operation of sleds only a comparatively short time of each year, many persons are deterred from having the use of a sled for the reason that the season being very short it appears undesirable that the investment for a sled be made, or that storage and care be provided for a sled which would necessarily be of use only a short portion of the year.

The purpose of my invention is to provide a combined wagon and sled which will be substantial and compact in structure, neat in appearance and proportions, and which will have all of the functions and requisites of a wagon, and at the same time, by slight manipulation thereof, may be converted into a sled which will be wholly practicable and useful.

Other purposes and objects of my invention are to provide such details of construction, conformation and arrangement of parts that the conversion of the device from its form of use as a wagon, to that of a sled, or vice versa, may be accomplished by any person exerting only the most ordinary skill, and without the use of tools or appliances of any kind; and that the device may be durable, of few parts, economical of manufacture and not liable to get out of repair or adjustment.

These objects are accomplished by the ingeniously constructed device and the novel combination and arrangement of parts described in this specification, pointed out in the claims, and illustrated in the accompanying drawings.

Figure 1:
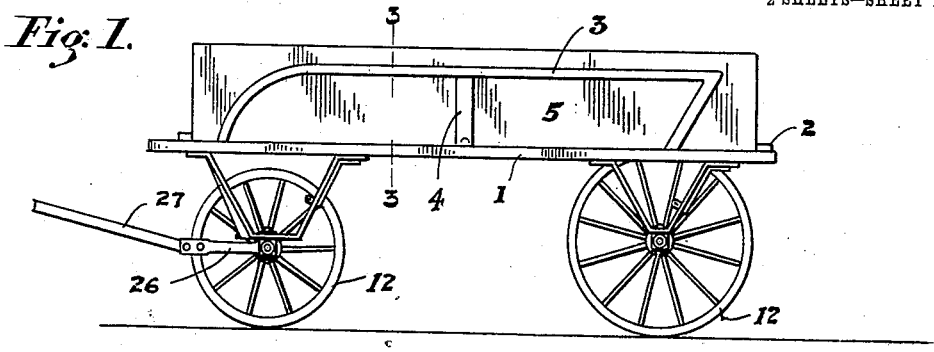
Figure 2:
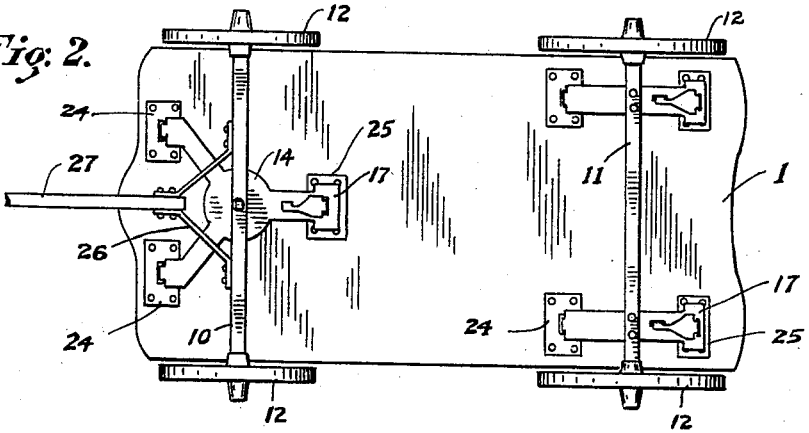
Figure 3:
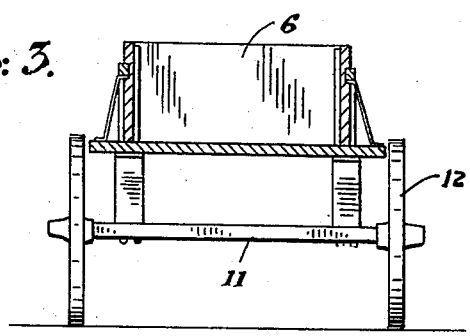

In the drawings Figure 1 is a side view of my newly invented combined wagon and sled complete, the wheels of one side thereof having been removed, and the main portion of the tongue having been broken away. Fig. 2 is a bottom view, and Fig. 3 is a transverse sectional view taken on the line 3—3 Fig. 1, of the device complete. Fig. 4 is a perspective view of one of the runners in position as secured to the floor of the device, the main portion of the latter being broken away. Fig. 5 is a perspective view of the device converted into a sled. Fig. 6 is a perspective view of the front and Fig. 7, of the rear running gear, the wheels thereof having been removed. Fig. 8 is a detached perspective view of the lock-bar, and Fig. 9 is a perspective view of a modified form of a wagon-bed.

My invention is shown as embodied in a device of proportions suitable for use as a toy vehicle for children, either as a pleasure device exclusively, or for the hauling of light loads, and is preferably made in lengths of thirty to forty eight inches.

Similar characters of reference refer to corresponding parts throughout the several views.

1 designates the floor, made of wood of suitable quality and thickness and stiffened transversely by the battens 2 secured thereon; these battens may be dispensed with where the floor is made of layers of wood extending lengthwise and transversely and glued together.

Disposed longitudinally along and a proper distance within the lateral edges of the floor are the runners 3, metallic, and of such size in cross section that they will be rigid and substantial. These runners have their ends turned inwardly from the edges of the floor and are countersunk in the floor and secured thereto by screws, as shown in Fig. 4. The diagonally disposed brace-bars 4 are provided so as to brace and firmly sustain the body-portions of the runners in proper position, and are firmly secured in place by suitable screws. The side-boards 5 are also made of wood of suitable thickness and are recessed in their outer faces to such depth and contour, that when placed in position they will engage the runners and thus be easily and firmly adjusted and retained in correct longitudinal position. The inner faces of the side-boards may either be channeled vertically, or may be provided with vertically disposed cleats at their ends to receive the transverse end-gates 6 which complete the structure of the bed-portion of the wagon.
By this construction is obtained a wagon-bed and floor, which, with or without the side-boards and ends, will be of utility either as a juvenile pleasure device exclusivly, or for the hauling of small objects.

A modified form of box-bed is shown at Fig. 9, made of sheet metal and intended for use where it is desired to dispense with the placing in position of the end-gates. Each of the sides 7 is made of a metal plate bent upon itself so that the runner may be snugly inclosed and the enlargement 8 will snugly inclose the brace-bar 4.
The ends of the plates of the sides 7 are pressed together, and the two sides are then connected the proper distance apart by the ends 9 made of plates angularly bent at their ends and riveted to the sides.

The front axle-tree 10 and the rear axle-tree 11 are made of metal of suitable area in cross section and are terminated at their ends by ordinary spindles on which are suitably journaled and secured the wheels 12.

Rotatably secured to the axle-tree 10 at its center, by the rigidly connected bolt 13, is the main-standard.
This main-standard is made from a single piece of sheet-metal of proper thickness and rigidity and is composed of the axle-plate 14 branched out from which are the three legs, two extending forwardly and one rearwardly the ends of each being bent and formed in the manner and for the purpose hereinafter described. 26 designates a pair of suitable bars secured on the front of the axle 10, their ends being brought together and secured on the opposite sides of the end of the tongue 27.

Rigidly secured to the axle-tree 11 by rivets, and spaced a proper distance apart, are the rear-standards, formed with forwardly and rearwardly extending legs. The forward legs of these rear-standards, as well as the forward-legs of the main-standard, are bent at a proper angle whereby the feet 15 are formed, and are then terminated with the tongues 16 of width less than the feet, bent upwardly and thence horizontally, as plainly shown in Fig. 6 and Fig. 7. The rearward legs of the rear-standard as well as the rearward leg of the main-standard, are bent at their ends at the proper angle and enlarged in width whereby the feet 17 are formed, having therein the transverse slots 18; also the slots 19 in these legs a suitable distance from the feet, are provided.

In Fig. 8 is shown the lock-bar, one being provided to apply to each of the rearward legs. These lock-bars consist each of a bar of metal substantially the same thickness as that of the legs, provided with the foot 20 and the tongue 21 identical in form with the feet 15 and the tongues 16 except that the vertical portion of the tongue is longer than the corresponding portion of the tongue 16. The other end of the lock-bar is of diminished width and has the nose 22 with the perforation 23 therein; the length of the lock-bar is such that when the foot 20 is in contact with the foot 17 the nose 22 will pass through the slot 19. Attached to the lock-bars by a light but substantial chain are the cotters 23.

Rigidly secured to the bottom of the floor, at predetermined suitable positions, so as to receive and afford a substantial connection and bearing for the feet of the main-standard and the rear-standards are the front and rear sets of shoe-plates 24 and 25 respectively, metallic, and of suitably neat outline. These shoe-plates are provided with transverse slots therein and are so countersunk and fitted in position that the surface line of the floor where the same are secured is not disturbed. Underneath the slot of these shoe plates a recess in the body of the floor is provided so that the tongues 16 and 21 may be freely passed through and may reside beneath the plates.

From the foregoing description of the construction of my novel device, the operation and use of the same will be readily understood.

To assemble my device the floor 1 having the runners secured thereto as heretofore described, is inverted and the main-standard and rear-standards having the front and rear shafts and wheels secured thereto, are placed in position with the tongues 16 inserted in the shoe-plates 24 and the feet 15 and 17 resting on the shoe-plates 24 and 25 respectively, the lock-bars are then placed in position by inserting the tongues 21 through the feet of the rear legs of the main-standard and of the rear-standards, and through the shoe-plates 25, the lock-bars are then brought down in contact with the legs and the noses 22 passed through the slots 19 and the cotters then passed through the perforation in the noses, bent into secure position, and the running-gears complete have been secured to the floor of the device in readiness for use; the device is then inverted so as to rest upon its wheels, then the side-boards are adjusted in position, the recesses for the runners being placed so as to incase the inner half of the runners; then the end-gates are placed in position and the wagon is complete. Thus is accomplished a wagon composed of few parts, all the parts of simple form and economical manufacture and easily assembled and disassembled, and which may be used either with the box-bed portion in position, or not, as may please the person handling the same. When it is desired to convert the device into a sled, the cotters are removed from the noses of the lock-bars and the entire running gears are easily and quickly removed; then the device presents the appearance shown in Fig. 5 and performs the functions of a sled exclusively. As shown in Fig. 5, the forward end of the floor is extended in a graceful curve and provided with a suitable aperture wherein a rope for drawing the sled may be inserted.

What I claim as my invention, and desire to secure by Letters Patent of the United States, is—

1. A combination wagon and sled, comprising a floor, standards below the floor having secured thereto axle-trees with wheels journaled thereon, the said standards being detachably secured to the floor, a pair of oppositely disposed runners secured to the top of the floor near its lateral edges, side-boards removably retained against and having recesses in their outer faces to engage the inner faces of the runners, and transverse removable end-gates extending across the floor and retaining the side-boards apart and in engagement with the said runners, substantially as described.

2. A device of the kind described, comprising a floor, a pair of oppositely disposed runners secured to the top of the floor near its lateral edges, a main-standard below the forward portion of the floor having rotatably secured thereto an axle-tree with wheels journaled thereon; a pair of rear-standards below the rear portion of the floor having rigidly secured thereto an axle-tree with wheels journaled thereon, devices secured to the floor to engage the feet of said main-standard and the read-standards, and devices to detachably connect to and secure said standards to said floor, substantially as described.

3. In a device of the kind described, the combination of a floor, a pair of oppositely disposed runners secured to the top of the floor near its lateral edges, a series of slotted shoe-plates 24 and 25 secured to the bottom of the floor at predetermined locations over recesses provided thereat, a main-standard including a disk-shaped body having two forward legs and a rearward leg branching therefrom, an axle-tree with wheels journaled thereon rotatably secured to the said main-standard, rear standards including a pair of plates forming two forward and two rearward legs, an axle-tree with wheels journaled thereon being rigidly secured to the said rear-standards, the forward legs of the main-standard and of the rear-standards being bent at their ends at a proper angle thence abruptly reduced in width and terminated with tongues bent upwardly and thence horizontally to engage the said shoe-plates 24, and the rearward legs of the main-standard and of the rear-standards being bent at their ends at a proper angle and enlarged in width and provided with a transverse slot 18 to register with the slots of the shoe-plates 25, and also a slot 19 being provided in the said rearward legs, devices to detachably connect to and retain the said rearward legs in engagement with the shoe-plates 25, substantially as described.

4. In a device of the kind described, the combination of a floor, a pair of oppositely disposed runners secured to the top of the floor near its lateral edges, a series of slotted shoe-plates 24 and 25 secured to the bottom of the floor at predetermined locations over recesses provided thereat, a main-standard including a disk-shaped body having two forward legs and a rearward leg branching therefrom, an axle-tree with wheels journaled thereon rotatably secured to the said main-standard, rear-standards including a pair of plates forming two forward and rearward legs, an axle-tree with wheels journaled thereon being rigidly secured to the said rear-standards, the forward legs of the main-standard and of the rear-standards being bent at their ends at a proper angle thence abruptly reduced in width and terminated with tongues bent upwardly and thence horizontally to engage the said shoe-plates 24, and the rearward legs of the main-standard and of the rear-standards being bent at their ends at a proper angle and enlarged in width and provided with a transverse slot 18 to register with the slots of the shoe-plates 25, and also a slot 19 being provided in the said rearward legs, lock-bars to detachably connect to and retain the rearward legs in engagement with the slotted plates 25, consisting of a bar having the foot 20, the tongue 21, the nose 22 with transverse perforation therein, and the cotters 23, substantially as described.

In testimony whereof I have hereunto subscribed my name in the presence of two subscribing witnesses.

NOAH H. CHALFANT.

Witnesses:
ARTHUR F. RUNYAN,
JOHN W. JONES.